United States Patent [19]

Tate et al.

[11] 3,946,813

[45] Mar. 30, 1976

[54] METHOD FOR STIMULATING WELL PRODUCTION

[75] Inventors: Jack F. Tate; Jim Maddox, Jr.; Russell D. Shupe, all of Houston, Tex.

[73] Assignee: Texaco Inc., New York, N.Y.

[22] Filed: Dec. 20, 1974

[21] Appl. No.: 534,958

[52] U.S. Cl. .............................. 166/307; 166/308
[51] Int. Cl.² .................. E21B 43/26; E21B 43/27
[58] Field of Search ........ 166/307, 305 R, 308, 271, 166/270, 273–275, 281, 282; 252/8.55 R, 8.55 C, 8.55 D

[56] References Cited
UNITED STATES PATENTS

| | | | |
|---|---|---|---|
| 3,500,923 | 3/1970 | Reisberg ........................ | 166/275 X |
| 3,508,612 | 4/1970 | Reisberg et al. ................ | 166/275 X |
| 3,515,214 | 6/1970 | Finch ............................ | 166/274 X |
| 3,572,440 | 3/1971 | Hutchison et al. ............. | 166/307 X |
| 3,578,781 | 5/1971 | Abrams et al. .................. | 166/305 |
| 3,791,446 | 2/1974 | Tate .............................. | 166/307 |

*Primary Examiner*—Stephen J. Novosad
*Attorney, Agent, or Firm*—T. H. Whaley; C. G. Ries; James F. Young

[57] ABSTRACT

The production of hydrocarbons from a subterranean hydrocarbon-bearing formation containing acid-soluble components, such as one composed at least in part of dolomite or limestone, is stimulated by injecting into the formation a composition comprising an aqueous solution of a mineral acid having dissolved therein a compound hereinafter described. The elimination of plugging of capillary openings within the formation and mineral scale deposition on production equipment due to post-precipitation of dissolved salts subsequent to acidization by means of the said compound results in a substantial improvement in hydrocarbon recovery.

13 Claims, 1 Drawing Figure

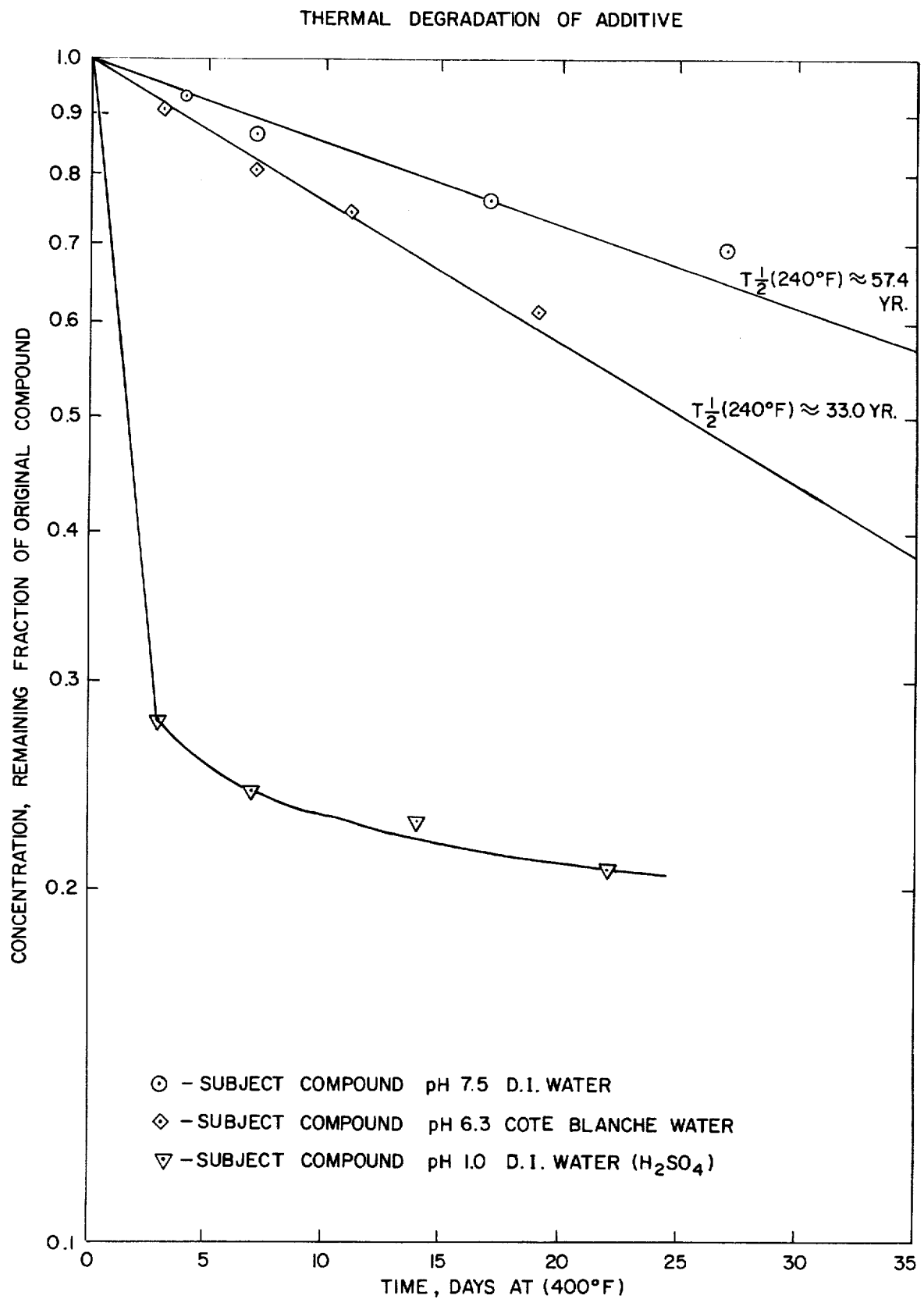

METHOD FOR STIMULATING WELL PRODUCTION

FIELD OF THE INVENTION

This invention relates to a method for stimulating the production of fluids from earthen formations. More particularly, this invention relates to a method in which the productivity of a hydrocarbon-bearing formation containing acid-soluble components and with or without water-sensitive clays or shales is improved upon treatment of the formation with an aqueous solution of a mineral acid and a compound as hereinafter described, said compound effecting the elimination of plugging of capillary openings due to post-precipitation of dissolved salts subsequent to the acidization as well as effecting elimination of mineral scale on production equipment such as pumps, tubing, etc., caused by such precipitation.

DESCRIPTION OF THE PRIOR ART

The technique of increasing the permeability of a subterranean hydrocarbon-bearing formation and of removing obstructing acid-soluble mineral scale for the purpose of stimulating the production of fluids therefrom has long been practiced in the art. One such method commonly employed is known as acidizing which is widely utilized in treating subsurface acid-soluble geological formations, e.g., limestone, dolomite, etc. The technique is not limited to application in formations of high acid solubility. Sandstone and gypsum-containing formations may require acidization if the produced water is unstable with respect to $CaCO_3$. In the usual well-acidizing procedure, a non-oxidizing mineral acid is introduced into the well and under sufficient pressure is forced into the adjacent subterranean formation where it reacts with formation components, and deposited mineral scale, particularly the carbonates such as calcium carbonate, magnesium carbonate, etc., to form the respective salt of the acid, carbon dioxide and water. The usual mineral acid employed in such acidization procedures is hydrochloric acid.

During the acidizing process passageways for fluid flow are created or existing passageways therein are enlarged thus stimulating the production of oil, water, brines and various gases. If desired, the acidization may be carried out at an injection pressure sufficiently great to create fractures in the strata or formation which has the desired advantage of opening up passageways into the formation along which the acid can travel to more remote areas from the well bore. The salt formed upon neutralization of the acid is extensively water soluble and is readily removed by reverse flow from the formation via the well bore.

There are, however, troublesome complications attending the use of hydrochloric acid or other similar non-oxidizing mineral acids. In the acidizing process, the following primary beneficial reaction occurs: $CaCO_3 + 2HCl \rightarrow CaCl_2 + H_2O + CO_2$. Under the higher pressures required to conduct an acidization, the $CO_2$ is dissolved in the reaction mixture consisting of spent acid and connate water: $CO_2 + H_2O \leftrightarrow H_2CO_3 \leftrightarrow H^+ + HCO_3^- \leftrightarrow 2H^+ + CO_3^{--}$. The equilibria may be summarized and written: $Ca(HCO_3)_2 \leftrightarrow CaCO_3 +$

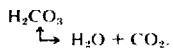

After acidization is completed, the well is often backflowed in the case of a water injection well (in order to clean out formation and tubing) and put back on production in the case of a producing oil or gas well. In both cases, pressure diminshes, $CO_2$ breaks out of solution, inducing $CaCO_3$ to precipitate. Such precipitation, when it occurs within the capillaries of a tight formation or on the tubing or annulus as a mineral scale, can severely lessen production or injection rate by plugging such capillaries or well equipment.

It is known that molecularly dehydrated polyphosphates are effective in retarding $CaCO_3$ precipitation. These polyphosphates are unsatisfactory in the method of the present invention because they undergo rapid hydrolysis in the presence of the mineral acid component required in the method of the present invention. As a result, the scale inhibiting properties of these polyphosphates are destroyed. In addition, one hydrolytic reaction product, the phosphate ion ($PO_4^{-3}$), can precipitate with calcium $^{+2}$ or barium $^{+2}$ ions present in the produced water, causing additional plugging or scale deposition, further aggravating the problem. The so-called "glassy" phosphates are known scale inhibitors. However, these glassy phosphates are unsatisfactory because of their slight solubility in acidic media and the tendency to form objectionable hydrolytic reaction products.

It is also known to employ various organic polymers to prevent the precipitation of mineral salts. Many of these polymeric materials are unstable in mineral acids. In such acidic media they undergo spontaneous depolymerization to an ineffective species. A representative polymeric material which undergoes such hydrolysis in the presence of acids is polyacrylamide. In addition, this polymer has a further disadvantage in that it is unstable in aqueous media at temperatures of about 250°F. and upwards. Many wells that may be treated by the method of the present invention have bottom hole temperatures of 250°–300°F. or higher.

The chemically altered natural polymers and natural polymers themselves, are effective inhibitors to prevent the precipitation of mineral salts. However, some materials such as sodium carboxymethylcellulose precipitate or decompose in the presence of mineral acids. Other known sequestering agents such as citric or tartaric acids, and/or complexing agents such as ethylenediaminetetraacetic acid and its water-soluble salts are known inhibitors to prevent the deposition of boiler scale in aqueous media. However, such materials are not applicable in the method of the present invention because they are not appreciably surface active and do not adsorb on the formation face.

It is therefore, the principal object of the present invention to overcome the defects of the prior art in acidizing fluid bearing formations such as hydrocarbon-bearing formations, etc., by providing a method of acidization employing the novel composition of this invention.

SUMMARY OF THE INVENTION

This invention encompasses and includes a method of increasing the production of fluids from a subterranean fluid-bearing formation having present acid-soluble components comprising injecting down the well bore to said formation and therefrom into said formation under a pressure greater than the formation pressure an aqueous acidizing composition hereinafter more fully described, maintaining said composition in contact with the formation strata for a time sufficient for the acid to chemically react with the acid-soluble components of the formation and/or acid-soluble mineral scale deposited on production equipment, to etch or enlarge passageways through the strata and remove the scale and thereby increase substantially the flow capacity of the said subterranean formation.

The novel aqueous acidizing composition of this invention comprises an aqueous solution of a non-oxidizing mineral acid, such as hydrochloric or sulfuric acid, having dissolved therein a compound hereinafter described. The concentration of acid present in the subject composition is such that it is capable of reacting with the acid-soluble components of the fluid-bearing strata.

BRIEF DESCRIPTION OF THE DRAWING

The FIGURE of the drawing graphically illustrates thermal stability of the additive of Examples X–XII of the present invention.

DETAILED DESCRIPTION OF THE INVENTION

In its broadest embodiment the method of the present invention comprises introducing into a subsurface formation containing acid-soluble components an aqueous acid solution of a compound hereinafter described, wherein the said solution is maintained in contact with the formation for a time sufficient to chemically react with the formation and/or acid-soluble mineral scale deposited on production equipment so as to increase substantially the flow capabilities of the formation and to release carbon dioxide concomitantly whereby a beneficial effect due to the mutual miscibility of carbon dioxide in the fluid phases is realized as a reduction in viscosity and retentive capillary forces, while another beneficial effect is realized in the form of increased formation energy, due to the pressure generated by the released carbon dioxide.

An advantage resulting from the employment of the method of this invention in acidizing fluid-bearing formations is that the post-precipitation of dissolved carbonates is prevented or materially decreased. Such post-precipitation occurs because of the nature of the dissolution reaction:

$Ca(HCO_3)_2 \leftrightarrow \underline{CaCO_3} + H_2O + CO_2\uparrow$.

When pressure is released so that spent reaction products from the acidization process can be removed, carbon dioxide gas can break out of solution, causing post-precipitation of calcium carbonate. Such post-precipitation occurring within the formation matrix near the bore hole can decrease permeability by plugging the formation capillaries, particularly those near the well bore, and result in a lower production rate. Furthermore, such post-precipitation can occur in the tubing or annulus of the well itself and manifest itself as mineral scale, reducing their diameter(s) and resulting in a lower production rate.

The compound useful in preparing the aqueous acidic solution of the present invention is a water-soluble sulfonated, ethoxylated alcohol having the following general formula

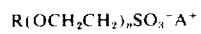

$R(OCH_2CH_2)_nSO_3^-A^+$ wherein R is an aliphatic hydrocarbon group containing from about 8 to about 20 carbon atoms, $n$ is a number from 1 to 10, and $A^+$ is a monovalent cation selected from the group consisting of sodium, potassium and ammonium, including mixtures.

Representative examples of compounds useful in the practice of the invention include the sulfonated, ethoxylated octyl, decyl, dodecyl, tridecyl, tetradecyl, pentadecyl, hexadecyl, heptadecyl, octadecyl, nonadecyl, and eicosyl alcohols including the branched chain isomers thereof. The alcohol can be either a primary or secondary alcohol or a mixture of any of these alcohols.

The ethoxy portion of the alcohol can be, for example, di-, tri-, tetra-, penta-, hexa-, octa-, nona-, and deca.

A particularly preferred group are the $C_{12}$–$C_{18}$ primary alcohols containing from about 3 to 10 ethoxy groups therein, and especially the sodium and ammonium salts of these materials.

Preferably the aqueous acid composition of this invention is one comprising an aqueous solution which may include brine and from about 0.5 to about 28%, preferably 3 to 15% by weight of a non-oxidizing mineral acid, such as hydrochloric acid and which contains therewith between from about 0.005 to about 2%, preferably from about 0.05 to about 1% by weight of the aforesaid compound.

Generally, the aqueous acidic solution will contain an inhibitor to prevent or greatly reduce the corrosive attack of the acid on metal. Any of a wide variety of compounds known in the art and employed for this purpose can be used, e.g., certain compounds of arsenic, nitrogen or sulfur as described by Grebe et al. in U.S. Pat. No. 1,877,504.

The amount of the inhibitor utilized is not highly critical and it may be varied widely. Usually this amount is defined as a small but effective amount, e.g., from 0.02% to about 2.0% by weight.

In carrying out the method of this invention, a solution containing the desired amount of the non-oxidizing mineral acid dissolved in water is first prepared. An inhibitor to prevent corrosion of acid on the metal equipment associated with the well is usually added with mixing in the next step. The compound in an amount within the stated concentration range is then admixed with the aqueous acid solution. The thus-prepared acid solution is forced, usually via a suitable pumping system, down the well bore and into contact with the production equipment and formation to be treated. As those skilled in the art will readily understand, the pressure employed is determined by the nature of the formation, viscosity of the fluid, and other operating variables. The acidization method of this invention may be carried out at a pressure of sufficient magnitude to overcome the weight of the overburden and create fractures in the formation. Propping agents, to prop open the fractures as created, for example 20 to 60 mesh sand, in accordance with known fracturing procedures, may be employed in admixture with the aqueous acidic solution. Generally, it is advisable to allow the aqueous acid solution to remain in contact with the formation and production equipment until the acid therein has been substantially depleted by reaction with the acid-soluble components of the formation and the deposited scale. After this, the substantially spent treating solution is reversed out of the well, i.e., it is allowed to flow back out or to be pumped out of the formation. Further, as those skilled in the art will understand, the concentrations of the compound and acid components should be chosen to provide an acidizing fluid of the desired rheological properties.

In the method of this invention, the compound of the composition provides means whereby calcium ions with tendencies to precipitate as $CaCO_3$ from a supersaturated solution of $CaCO_3$ or $Ca(HCO_3)_2$ that is produced by the reaction of acid component with the formation, or previously deposited acid-soluble mineral scale, combine with the compound moiety to form a highly stable complex therein so that solid calcium carbonate does not precipitate from the spent treating solution. This binding up of the aforementioned calcium ions from weakly ionizable compounds permits the formed complex to remain dissolved in the treating solution and pass through the formation pores and production equipment.

Further, the compound component of the aqueous acidic solution of the invention provides means whereby the nucleation and growth of the solid itself is thwarted, so that solid calcium carbonate does not precipitate from the spent treating solution.

Finally, the compound provides means whereby continuous protection against post-precipitation of $CaCO_3$ is obtained for a considerable period of time subsequent to treatment due to continuous slow desorption of the component from the formation surfaces. In contrast, use of surfactants having merely dispersant and suspending properties and not possessing the capability of molecularly binding up these produced calcium ions or thwarting the nucleation and growth of the solid $CaCO_3$ will permit deposition of calcium carbonate to occur from such treating solution with the likelihood of plugging the formation passageways and production equipment during subsequent recovery of desirable formation hydrocarbons therethrough.

If desired, one can also add to the aqueous acidic solution containing the compound a polymeric material to retard the acid components tending to attack the calcareous components of the formation. Suitably, a polyvinylpyrrolidone, as more particularly described in U.S. Pat. No. 3,749,169, issued July 31, 1973, is particularly desirable and the disclosure of said patent is herein incorporated by reference.

Following is a description by way of example of the method of the invention.

EXAMPLE I

A producing well in East Texas can be treated in the following manner.

A treating mixture is prepared by mixing 10 barrels of salt water containing about 2.6% sodium chloride and 13 barrels of 28% by weight aqueous hydrochloric acid. There is added thereto 0.1 barrel of the sodium salt of sulfonated, pentaethoxylated mixed $C_{12}$–$C_{18}$ alcohols.

The treating mixture is squeezed into the formation at a rate of about ½ BPM at 450 psig. The shut-in tubing pressure is 450 psig which is bled down to zero in a short time. The well can then be returned to production.

EXAMPLE II

A treating mixture is prepared from 10 barrels of salt water (2.6% sodium chloride) and 9 barrels of 15% by weight aqueous hydrochloric acid solution containing 0.2 barrel of the same compound. The aqueous acidic solution is injected into the production formation in the manner approximating that used in Example I. Thereafter 20 barrels of water are used to overflush the treated formation by injection down the tubing, followed by injection of 10 barrels of water down the casing. The well is then able to be returned to production.

EXAMPLE III

The aqueous acidic solution of Example II is injected into another producing formation. An overflush of 10 barrels of water is used to force the aqueous acidic solution into the formation by injection down the tubing. The well is able to be returned to production.

EXAMPLES IV – XII

The procedure set forth in Examples I–III above is repeated using

IV–VI — Sulfonated, triethoxylated mixed $C_{12}$–$C_{18}$ alcohols containing 40% dodecyl, 30% tetradecyl, 20% hexadecyl, and about 10% octadecyl groups, sodium salt.

VII–IX — Sulfonated, triethoxylated mixed $C_{10}$–$C_{14}$ alcohols containing 80% decyl, 10% dodecyl and 10% tetradecyl groups, sodium salt.

X–XII — Sulfonated, pentaethoxylated mixed $C_{10}$–$C_{14}$ alcohols containing 85% decyl, 9% dodecyl, and 6% tetradecyl groups, sodium salt.

It has been found that the compounds used in the acid solutions of the present invention are especially effective in the presence of high calcium ion concentrations to 1% by weight or more, and particularly and somewhat uniquely in application where high aqueous solution temperatures are encountered such as above 100°C. The compounds of the present invention are temperature stable and effective as scale inhibitors at temperatures up to about 150°C., e.g., 100°–150°C.

The unusual thermal stability of one of the species of the compounds is graphically shown by the accompanying drawing.

In the drawing the graph is constructed on one cycle semi-logarithmic paper having 70 linear divisions along the abscissa.

These data were obtained using the compound of Examples X–XII.

At normal operating pH's of 7.5 and 6.3 in deionized water and a representative field water, respectively, half lives at 116°C. (240°F.) are 57.4 and 33 years. The actual experiments were conducted at 400°F., and the half lives extrapolated to 240°F. It is seen that at pH 6.3 in field water at as high a temperature as 204.5°C. (400°F.), a half life of 25 days is attained. At a pH of 1, 23% activity remained after 15 days at 400°F.

In a separate experiment, the unusual stability of the compound is exhibited by the fact that after exposure of an aqueous solution of the compound of Examples I–III at 177°C., for 5 days, 93.5% activity remained. Furthermore, after 3 hours exposure to 13% sulfuric and at 177°C., 66% of its activity remained.

The disclosed compounds may be prepared in the following manner:

The ethoxylated alcohol is reacted with thionyl chloride for about 18 hours at about 100°C., to form the monochloro derivative, followed by reaction of said monochloro derivative with sodium sulfite for about 18 hours at about 155°C., in a 1/1 by volume admixture of water and ethanol in a Paar Bomb. The resulting recovered sulfonated product, on analysis, showed about 75% sulfonation of the terminal ethoxy group.

This method of preparation is exemplary only, but was the method employed to prepare some of the compounds. Those skilled in the art may perceive other synthetic schemes.

For example, the sulfonated ethoxylated alcohols of the present invention can be prepared from sulfated ethoxylated alcohols by treatment with sodium sulfite at 200°C. for about 10-12 hours, resulting in relatively high yields (75-80%) of the desired sulfonate. The (sulfate) starting material, can be prepared by reaction of an ethoxylated aliphatic alcohol, including mixtures thereof with such reagents as sulfuric acid or chlorosulfonic acid to obtain the sulfated ethoxylated alcohol.

The compounds used in Examples I-VI in the above were prepared by reacting a commercially available mixed $C_{12}$-$C_{18}$ alcohols (Conoco-Alfol 1218) with ethylene oxide to adduct thereto 5 and 3 ethoxy groups respectively. The resulting respective ethoxylated alcohols were then sulfonated as described above. In a similar manner, the compounds of Examples VII-XII were prepared using commercially avaialble mixed $C_{10}$-$C_{14}$ alcohols, (Conoco Alfols 1014 and 1012).

Obviously, many modifications and variations of the invention as hereinabove set forth may be made without departing from the spirit and scope thereof, and therefore only such limitations should be imposed as are indicated in the appended claims.

We claim:

1. A method of increasing the production of fluids from a subterranean fluid-bearing formation having present therein acid-soluble components comprising injecting down the well bore penetrating said formation and injecting therefrom into said formation under a pressure greater than the formation pressure, an aqueous acidic solution containing from about 0.5 to about 28% by weight of a mineral acid having a compound therein in an amount of from about 0.005% to about 2% by weight, said compound being a water soluble sulfonated, ethoxylated compound having the general formula $$R(OCH_2CH_2)_nSO_3^-A^+$$

wherein R is an aliphatic hydrocarbon group containing from about 8 to about 20 carbon atoms, n is a number from 1 to about 10, including fractions, and $A^+$ is a monovalent cation selected from the group consisting of sodium, potassium, and ammonium, including mixtures, maintaining said solution in contact with the formation and production equipment for a time sufficient for the acid component to chemically react with the acid-soluble components of the formation to etch passageways therethrough thereby increasing substantially the flow capacity of the said subterranean formation and whereby said sulfonated, ethoxylated compound component is effective to prevent the formation of insoluble calcium compounds or the precipitation of calcium carbonate from the acid-spent solution.

2. Method as claimed in claim 1, wherein said compound is present in said aqueous solution in an amount of from about 0.05% up to about 1% by weight.

3. Method as claimed in claim 1, wherein said compound is the sodium salt of a sulfonated pentaethoxylated dodecyl alcohol.

4. Method as claimed in claim 1, wherein said compound is the sodium salt of a sulfonated hexaethoxylated hexadecyl alcohol.

5. Method as claimed in claim 1, wherein said compound is the sodium salt of a sulfonated heptaethoxylated pentadecyl alcohol.

6. Method as claimed in claim 1, wherein said compound is the sodium salt of a sulfonated pentaethoxylated mixed $C_{12}$-$C_{18}$ aliphatic alcohol.

7. Method as claimed in claim 1, wherein said compound is the sodium salt of a sulfonated, pentaethoxylated mixed $C_{12}$-$C_{18}$ aliphatic alcohol containing from about 35 to 45% $C_{12}$ alkyl, 25 to 35% $C_{14}$ alkyl, 15 to 25% $C_{16}$ alkyl and 5 to 15% $C_{18}$ alkyl groups.

8. Method as claimed in claim 1, wherein said acid is present in the solution in an amount of from about 3 to about 15% by weight.

9. Method as claimed in claim 1, wherein said acid is hydrochloric acid.

10. Method as claimed in claim 1, wherein said acid is sulfuric acid.

11. Method as claimed in claim 1, wherein the said formation is a hydrocarbon-bearing formation.

12. Method as claimed in claim 1, wherein the said aqueous acidic solution is injected down the well bore penetrating said formation under a pressure greater than the formation pressure and sufficient to create fractures in the formation.

13. Method as claimed in claim 1, wherein the said aqueous acidic solution is injected down the well bore penetrating said formation under a pressure greater than the formation pressure but less than the pressure required to create fractures in the formation.

* * * * *